United States Patent
Kayes et al.

[11] Patent Number: 5,940,855
[45] Date of Patent: *Aug. 17, 1999

[54] SYSTEM AND METHOD FOR DETERMINING RELATIVE CACHE PERFORMANCE IN A COMPUTER SYSTEM

[75] Inventors: Kevin W. Kayes; Daniel H. Schaffer; Brian Berliner, all of Colorado Springs, Colo.

[73] Assignee: Sun Microsystems, Inc., Palo Alto, Calif.

[*] Notice: This patent is subject to a terminal disclaimer.

[21] Appl. No.: 09/053,843

[22] Filed: Apr. 1, 1998

Related U.S. Application Data

[63] Continuation of application No. 08/627,936, Mar. 28, 1996, Pat. No. 5,809,523.

[51] Int. Cl.$^6$ .................................................. G06F 12/08
[52] U.S. Cl. ........................ 711/118; 711/133; 711/138; 711/167
[58] Field of Search ..................... 711/118, 133, 711/138, 167

[56] References Cited

U.S. PATENT DOCUMENTS 4,833,642  5/1989  Ooi ............................................. 365/49

Primary Examiner—Reginald G. Bragdon
Attorney, Agent, or Firm—Francis A. Sirr; William J. Kubida; Holland & Hart LLP

[57] ABSTRACT

A system, method and computer program product which determines the relative performance of a local cache and renders the resultant performance increase (or in certain circumstances, the decrease) in cache performance of a stand-alone computer or networked "client" perceptible to the user in an especially intuitive manner. By accurately tracking and factoring in the times and amounts of data read from one or more source locations and the cache, the amount of time required to execute "read" operations without the cache can be determined. By dividing this time period by the actual time to execute the "read", the true relative performance of the cache may be determined.

16 Claims, 4 Drawing Sheets

SYSTEM AND METHOD FOR DETERMINING RELATIVE CACHE PERFORMANCE IN A COMPUTER SYSTEM

This application is a continuation of U.S. patent application Ser. No. 08/627,936, filed Mar. 28, 1996, now U.S. Pat. No. 5,809,523.

CROSS REFERENCE TO RELATED APPLICATIONS

The present invention is related to the subject matter disclosed and claimed in U.S. patent application Ser. No. 08/623,627 now U.S. Pat. No. 5,745,737 issued Apr. 28, 1998 for "System and Method for Visually Indicating Cache Activity in a Computer System" filed on even date herewith and assigned to Sun Microsystems, Inc., assignee of the present invention, the disclosure of which is hereby specifically incorporated herein by this reference.

BACKGROUND OF THE INVENTION

The present invention relates, in general, to the field of computers and computer memory systems. More particularly, the present invention relates to a system and method for determining relative cache performance in a computer system utilizing a computer mass storage device such as a rotating, randomly accessible mass storage medium, comprising a "hard", "fixed", "rigid" or Winchester disk drive, as a data cache for a remote network data source or another relatively slower computer mass storage device such as a compact disk read-only memory ("CDROM").

As a general rule, central processors can process data significantly more quickly than it can be moved in and/or out of primary storage, or the data "source". Consequently, the performance of a computer system is substantially limited by the speed of its primary data storage devices, networks and subsystems. In order to ameliorate this perceived "bottleneck", central processor interaction with the data source may be minimized by storing frequently referenced data in a relatively small, high-speed semiconductor memory cache located between the processor and the primary storage devices. However, such semiconductor memory, whether dynamic or static random access memory ("DRAM" or "SRAM"), is relatively costly per megabyte of storage compared to disk drives (on the order of eighty times more expensive) and, as such, the cache must generally be of comparatively limited capacity. Small caches function relatively well for repeatedly small data burst loads but poorly for sustained loads.

When utilizing caching techniques, should a program issue a "read" command for an instruction or user data, the processor first looks in its cache. Should the requested data reside in the cache, (a cache "hit") there is no need to attempt to read from the data source which may be located on a network, CDROM or any other relatively slow access time device or subsystem. However, if the requested data is not available in the cache, (a cache "miss") the processor must then access the data source in order to retrieve the data sought.

Data which must be retrieved from the data source may then be written to the cache where it may later be accessed by the processor directly without a request directed to the original data source. Alternatively, any data which may be subsequently modified by the processor may also be written to the cache. In any event, inasmuch as a semiconductor memory or other cache may have relatively limited storage capacity, a data replacement algorithm of some sort is generally used to determine what existing data should be overwritten in the cache when additional data is read from primary storage.

In light of the foregoing, the current trend is toward ever larger semiconductor cache sizes or the utilization of local caching to an associated hard disk drive. Heretofore however, the computer user has had no way of readily determining the performance advantages of his local data cache, particularly in a way that accurately factors in the additional "overhead" of initially writing data to the cache from the source network, CDROM or relatively slower access time computer mass storage device.

SUMMARY OF THE INVENTION

The system, method and computer program product of the present invention is of especial utility in facilitating the determination of cache performance and renders the performance increase (or in certain circumstances, the decrease) in cache performance of a stand-alone computer or networked "client" perceptible to the user in an especially intuitive manner. By accurately tracking and factoring in the times and amounts of data read from one or more source locations and the cache, the amount of time required to execute "read" operations without the cache can be determined. By dividing this time period by the actual time to execute the "read", the true relative performance of the cache may be determined.

As in any caching environment, the caching software must first read data from the source in order to populate the cache for future "read" accesses to the same data. The time required to read the data from the source is measured by a timer function and recorded as a variable $T_S$ (source time, in seconds) along with the amount of data read $D_S$ (source data, in bytes). From these values, a rate $D_S/T_S$ bytes/seconds is determined for the data "read" from the original data source. When the data is copied to the cache, the time required for the transfer is added to a variable $T_C$ (cache time, in seconds) which also includes the time required to access the data from the cache. The amount of data read from the cache is added to a fourth variable, $D_C$ (cache data, in bytes).

The amount of time required to read all of the data, or the sum $(D_S+D_C)$, from the source without caching available $(T_{NC})$ is the sum of the time required to populate the cache $(T_S)$ plus the amount of time required to perform the cache "read" operation at source speeds $(D_C/(D_S/T_S))$. Stated another way:

$$T_{NC}=T_S+(D_C/(D_S/T_S))$$

The total actual time $(T_A)$ is equal to $(T_S+T_C)$. Therefore, relative performance $(P_R)$ can be defined as:

$$P_R T_{NC}/T_A; \text{ or}$$

$$P_R=(T_S+D_C/(D_S/T_S))/(T_S+T_C)$$

Expressing this ratio in terms of percentages, 100% would represent that the performance with and without caching would be the same. On the other hand, a relative performance rating $P_R$ of, for example, 500% would mean that the system is performing five times faster with cache accesses.

Particularly disclosed herein is a system and method for determining the relative performance of data accesses to either of first and second data sources wherein the method comprises the steps of retrieving a requested amount of selected data $(D_C)$ from the second data source if the requested amount of selected data is in the second data source and timing the step of retrieving the requested amount of selected data from the second data source to provide a time ($T_C$). The method further comprises the steps of alternatively retrieving the requested amount of selected data ($D_S$) from the first data source if the requested amount of selected data is not in the second data source; timing the step of alternatively retrieving the requested amount of selected data from the first data source to provide a time ($T_S$); writing the requested amount of selected data to the second data source; and determining a time for the step of writing the requested amount of selected data to the second data source and adding the time to ($T_C$). The relative performance of the data accesses is then given by the equation:

$$P_R=(T_S+D_C/(D_S/T_S))/(T_S+T_C).$$

More particularly disclosed herein is a system and method for determining the relative performance of data accesses to either of first and second data sources wherein data in the second data source corresponds to data previously retrieved from the first data source. The method comprises the steps of initiating a request for x bytes of data; determining if the x bytes of requested data is in the second data source; and retrieving the x bytes of requested data from the second data source if the x bytes of requested data is in the second data source. The step of retrieving further comprises the steps of saving a number of the x bytes of requested data into a variable $D_C$ and saving a time necessary to retrieve the x bytes of requested data from the second data source into a variable $T_C$. The method further comprises the steps of alternatively retrieving the x bytes of requested data from the first data source if the x bytes of requested data is not in the second data source, with the step of alternatively retrieving further comprising the steps of saving a number of the x bytes of requested data into a variable $D_S$; saving a time necessary to retrieve the x bytes of requested data from the first data source into a variable $T_S$; writing the x bytes of requested data to the second data source; and saving a time necessary to write the x bytes of requested data to the second data source into a variable $T_C$. The method then comprises the step of computing a performance ratio ($P_R$) of the data accesses in accordance with the formula:

$$P_R=(T_S+D_C/(DS/T_S))/(T_S+T_C).$$

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A PREFERRED EMBODIMENT

Figure 1:
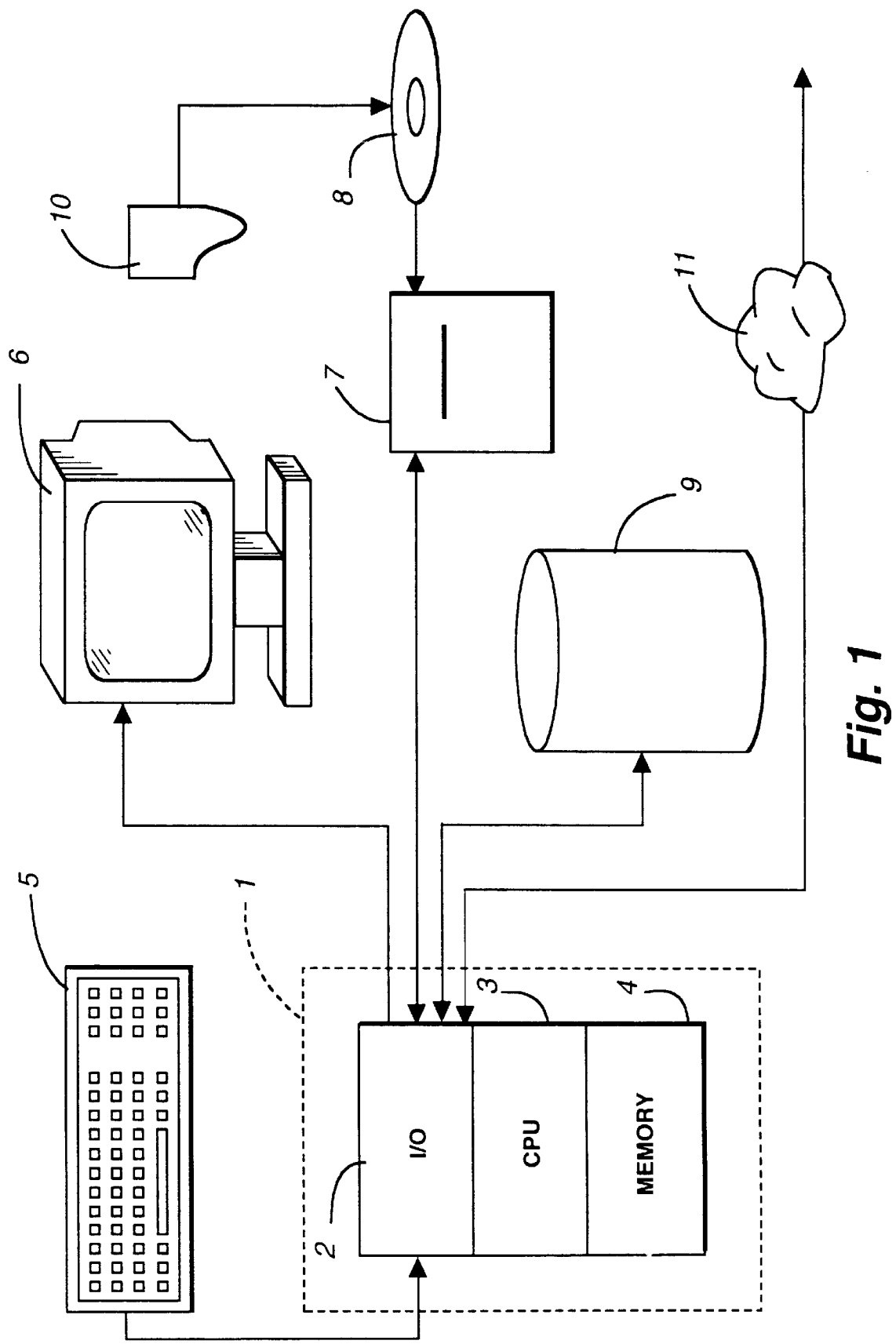
FIG. 1 is a simplified representational drawing of a general purpose computer forming a portion of the operating environment of the present invention.

The environment in which the present invention is used encompasses the general distributed computing system, wherein general purpose computers, workstations or personal computers are connected via communication links of various types, in a client-server arrangement, wherein programs and data, many in the form of objects, are made available by various members of the system for execution and access by other members of the system. Some of the elements of a general purpose workstation computer are shown in FIG. 1, wherein a processor 1 is shown, having an input/output ("I/O") section 2, a central processing unit ("CPU") 3 and a memory section 4. The I/O section 2 may be connected to a keyboard 5, a display unit 6, a disk storage unit 9, a CDROM drive or unit 7 or a computer network 11 such as a wide area network ("WAN"), local area network ("LAN") or other network connection such as the Internet. The CDROM unit 7 can read a CDROM or CDROM medium 8 which typically contains programs 10 and data. The computer program products containing mechanisms to effectuate the apparatus and methods of the present invention may reside in the memory section 4, or on a disk storage unit 9 or on the CDROM 8 or network 11 of such a system.

Figure 2:
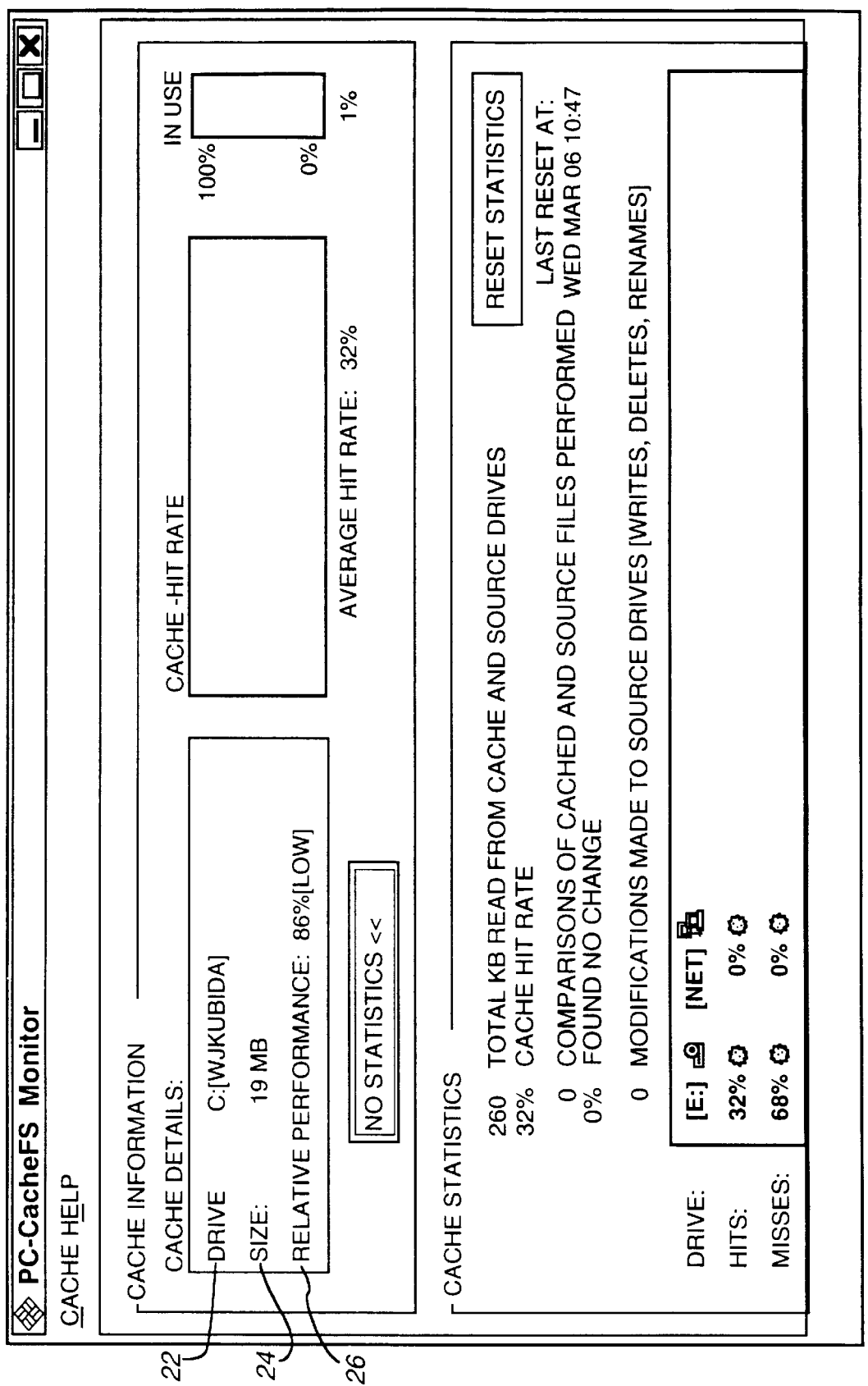
FIG. 2 is a representative graphical user interface ("GUI") for a particular computer program product implementation of the system and method of the present invention.

With reference now to FIG. 2, a graphical user interface 20 is shown for displaying, inter alia, the relative cache performance ratio determined by the system and method of the present invention. The graphical user interface 20 includes, in the example shown depicting the computer program product PC-CacheFS™ developed and licensed by Sun Microsystems, Inc., assignee of the present invention, a cache drive designator 22, cache size designator 24 and relative cache performance indicator 26. The cache drive designator 22 provides a visual indication of, for example, the local computer hard disk drive 9 (FIG. 1) a portion of which has been configured as a local cache. The cache size designator 24 indicates the size of the cache on the computer mass storage device indicated by the cache drive designator 22. The relative cache performance indicator 26, in turn, displays as a percentage a cache performance ratio computed as will be more fully described hereinafter. As shown, the relative cache performance indicator 26 may also include an additional descriptor indicating whether or not the performance ratio determined and displayed is [low] or [high].

In the ensuing discussion of the exemplary PC-CacheFS program implementation of the system and method of the present invention, the following definitions shall pertain:

Access

Gaining use of information, typically from a remote location.

Average Cache-Hit Rate

The blue line on the Cache-Hit Rate graph of the GUI 20 represents the Average Cache-Hit Rate. Also displayed as a percentage under the Cache-Hit Rate graph, the Average Cache-Hit Rate represents average number of hits compared to the total number of hits and misses each time the PC-CacheFS program makes a consistency check.

Cache

A special place, for example on the hard drive 9 (FIG. 1) of a personal computer, reserved for storing the information you use most. To cache a network drive is to cause it to contribute information to a cache.

Cache-Hit Rate

The percentage of files read from the cache divided by the total number of files read from remote locations.

Capacity

Capacity is computed by taking the sum total size of files in the cache and dividing it by the total size defined for the cache. Capacity is reflected in the In Use graph in the PC-CacheFS program main window. if the In Use graph displays 25%, it means that 25% of the cache is being utilized. Therefore, if the cache size is 20 megabytes (as reflected in the cache size designator 24), and the capacity is 25%, only 5 megabytes of space is being used.

Consistency Check

A comparison between the date of file or directory information currently in the cache and the date of file or directory information on the remote drive.

Custom Installation

In a custom installation, the cache is manually set up, determining cache settings such as cache size, location (as reflected by the cache drive designator 22), and the network drives to be cached. These settings are selected in the Cache Configuration dialog box. A custom installation can be used if a system condition exists that cannot be fulfilled by an express installation, such as caching a CDROM drive 7.

Directory Timeout

The Directory Timeout determines how long the PC-CacheFS program will retain a cached copy of directory information. The minimum and maximum timeout values establish a range. The PC-CacheFS program selects a value within the range based on the amount of time that has passed since the directory was modified. Recently modified directories are read again more quickly than less-recently modified directories. If a file is copied to the source drive from a computer other than the user's while the PC-CacheFS program retains a cached copy of the directory, the file will not be seen until the timeout expires. Setting low timeout minimum and maximum values increases directory consistency at the expense of network traffic. It is recommended to use longer minimum and maximum timeout values for directories that are modified only from the user's computer, or if when using network connections resulting in slower network performance, such as serial connections including PPP, SLIP, or RAS.

Disk-Based Caching

Caching in which data is stored on a hard disk. The amount of data stored relies on the amount of storage space on the hard disk. The information stored in the cache is retained following restart of the computer.

Express Installation

In an express installation, the PC-CacheFS program automatically sets up the cache. Cache settings such as cache size (reflected by the cache size designator 24), location (reflected by the cache drive designator 22), and the network drives to be cached are determined according to the current configuration of the computer and network. An express installation uses the PC-CacheFS program default settings, such as automatic caching of all network drives. The caching of CDROM drives 7 is not a default. If there is a need to cache a CDROM drive 7, or if another system condition exists that cannot be met in an express installation, a custom installation can be used.

File Timeout

The file timeout determines how often the PC-CacheFS program compares the modification time of the file on the source drive with the cached copy. The minimum and maximum timeout values establish a range. The PC-CacheFS program selects a value within the range based on the amount of time that has passed since the file was modified. Recently modified files are checked for consistency more frequently than less-recently modified files. Setting low timeout minimum and maximum values increases file consistency at the expense of network traffic. Larger timeout minimum and maximum values for files that change infrequently should be used or if using connections resulting in slower network performance, such as serial connections including PPP, SLIP, or RAS.

Hits

The number of times a user's files are accessed locally from the cache instead of over a network, off a server, or on a CDROM 8. Every time a read function is performed, such as opening or closing a file, the PC-CacheFS program is enabled to retrieve the information from its location. A "hit" occurs whenever the PC-CacheFS program retrieves the information from your cache. A "miss" occurs if the PC-CacheFS program retrieves the information from the remote location or data source.

When a hit occurs, a green light displays in the Hits field of the PC-CacheFS main window. A greater number of hits means that information in the cache is being used more often than in the remote location. The Cache-Hit Rate increases and the average Cache-Hit Rate line—the blue line—on the Cache-Hit Rate graph rises. This increase in the Cache-Hit Rate indicates that: the cache is working effectively; the speed at which information can be retrieved increased; and the speed of the network has increased because you information is being used locally in the cache.

Incremental Cache-Hit Rate

The green line on the Cache-Hit Rate graph represents the Incremental Cache-Hit Rate. The Incremental Cache-Hit Rate represents the number of hits compared to the total number of hits and misses over time.

Load

A measure of the activity on a network. As more people use the network, the load on the network increases. Increased load results in a slower network. As the load increases on the network, a user will have to wait longer periods of time to gain the information or files needed.

Memory-Based Caching

Caching in which the amount of information stored relies on the amount of memory available on the client. Only small amounts of information can be stored for short periods of time and are lost when the computer is rebooted.

Miss

The number of times files are accessed from a remote location or off of a CDROM drive 7 or other relatively slower access time data source rather than from the cache located on the local hard drive 9. Every time a read function is performed, such as opening or closing a file, the PC-CacheFS program is enabled to retrieve the information from its location. A "hit" occurs whenever the PC-CacheFS program retrieves the information from the local cache. A "miss" occurs if the PC-CacheFS program retrieves the information from the remote location or other data source.

When a "miss" occurs, an amber light is displayed in the Miss field of the PC-CacheFS main window. A greater number of "misses" means that information in the remote location is used more often than information in the cache. The Cache-Hit Rate decreases and the average Cache-Hit Rate line—the blue line—on the Cache-Hit Rate graph falls. This decrease in the Cache-Hit Rate indicates that: the cache is not working as effectively as it could be; the speed at which information can be retrieved is the same as it would be without the PC-CacheFS program; and the speed of the network has decreased because the network is being used to retrieve information.

Non-Volatile Caching

Non-volatile caching is a means of storing information, such as files, in a secure place where it will not be lost upon power-down or reboot of the computer. With the PC-CacheFS program, information is stored on the computer's hard drive 9.

Read Size

The Read Size is a measure of the number of bytes of information used during a "read" function. A "read" function is any task that retrieves information from a file or a directory and causes it to display on the associated monitor 6. "Read" functions include tasks such as opening files or creating new files.

In the PC-CacheFS program main window, the "read" size is reflected in the Total Kbytes Read from Cache and Source Drives. Performing the same "read" function continually causes the Cache-Hit Rate to increase. This increase is reflected in both the Cache-Hit Rate graph and the Cache-Hit Rate field.

The PC-CacheFS program breaks down large read requests from a remote location into smaller blocks of the specified Read Size to assist the computer in performing other tasks in a timely manner. The list of Read Size values can be selected in the Advanced dialog box and includes: 512, 1024, 2048, 4096, and 8192 bytes. The default value of 8192 bytes is suitable for LANs. A smaller Read Size should be utilized if network connections are used resulting in slower network performance, such as serial connections including PPP, SLIP, or RAS.

Transparent

Once installed, PC-CacheFS performs its functions without interfering with other application programs or the way in which a user otherwise interacts with the computer.

Volatile Caching

Volatile caching relies on the computer's available memory as temporary storage for your information. This information is lost when computer is powered down or rebooted.

Write Size

The Write Size is a measure of the number of bytes of information used during a "write" function. A "write" function is any task that causes information in the cache to be changed. "Write" functions include saving a file, deleting a file, or renaming a file. In the PC-CacheFS main window, the effects of write functions are displayed in the field, Modifications Made to Source Drives (Writes, Deletes, Renames).

"Write" functions are usually followed by "read" functions. For example, after saving a file (a "write" function) it can then be closed (a "read" function). Because the information in the cache is changed during a "write" function, the "read" functions that follow write functions are always "misses". An amber light displays in the Miss filed of the PC-CacheFS program main window when these functions occur.

The PC-CacheFS program breaks down large "write" requests to a remote location into smaller blocks of the specified Write Size to help the computer perform other tasks in a timely manner. The list of Write Size values which can be selected in the Advanced dialog box includes: 512, 1024 2048, 4096, and 8192 bytes. The default value of 8192 bytes is suitable for LANs. A smaller Write Size should be utilized if using network connections resulting in slower network performance, such as serial connections including PPP, SLIP, or RAS.

In the particular embodiment illustrated in FIG. 2, the system and method of the present invention may be incorporated into a computer program application that can also serve to reduce network traffic and improve system performance by copying the files most frequently accessed from a server to the client's local hard drive 9. This technique is referred to as caching as described previously and a portion of the hard drive 9 may be used, for example, as a cache. Caching allows quicker access to files because they can be read from the local hard drive 9, or other cache, instead of across the network thereby speeding access to requested files resident at remote locations, such as a server in a WAN, a directory accessed across a phone line or from a relatively slower access time CDROM drive 7. Utilizing the PC-CacheFS program illustrated, the recommended cache size is generally on the order of 30 megabytes for typical applications. Smaller hard drives or disks with little available space may necessitate a smaller cache. On the other hand, for larger hard drives, a larger cache may be specified.

When the PC-CacheFS program first retrieves information from a remote source and copies it into the cache, it retrieves as much information as will fill the cache. As the information is modified, the application updates the remote server and the local cache and will cache all the files accessed from the network data source. When the cache is full, the application overwrites the files in the cache that are least recently used ("LRU"). If a file is being shared in a Read-Only mode and the file is changed by another user, the PC-CacheFS program does not update the cache until an updated copy of the file is requested from the server.

The PC-CacheFS application program may be designed to function with all network protocols, and as a generic industry-standard caching product, it is designed to work on a personal computer connected to any kind of network. The system and method of the present invention utilized therein may be made compatible with Microsoft® Windows™, Windows95™ and other industry standard operating systems.

The PC-CacheFS program is designed to be transparent to the user and it does not interfere with, or compensate for, the operation of client-server applications. In other words, if a client-server application provides the capability to share a file among multiple users, the PC-CacheFS program works within the file-sharing process of the application. If the application does not share files, the PC-CacheFS program does not compensate for possible deficiencies in data consistency.

If a network connection is lost, the PC-CacheFS program does not compensate by saving an updated copy on disk until the connection with the server is reestablished. If the server connection is lost while changing the contents of a file, the only place those changes will be stored is to the local system's memory. However, once contact has been reestablished with the server and changes may be saved to disk on the server, the PC-CacheFS program updates the local cache to reflect the new contents of the file on the server.

Upon system reboot, the PC-CacheFS program does not download a new copy of the files it was caching when the local system was shut down. If the contents are the same, the PC-CacheFS program does not update its cache. If the contents of some files have changed, the PC-CacheFS program only updates the changed files. This scheme further reduces network traffic and improves system performance.

PC-CacheFS installs a Virtual Device Driver ($V_xD$) which becomes part of the Windows™ operating system after rebooting. The PC-CacheFS Monitor application does not need to run for PC-CacheFS to provide caching services. The PC-CacheFS program window may be viewed at any time, for example, to look at cache statistics, change cache settings, flush the contents of the cache, or delete the cache. The PC-CacheFS program is compatible with, and may be started up, for example, in either Windows95™, Windows™ 3.1 and Windows™ for Workgroups 3.11.

After starting up the PC-CacheFS program for the first time after an express installation, custom cache settings may be selected by the user in order to set up the cache with desired settings. The cache can be set up again if it is ever deleted. For example, if new applications are added after installing the cache, it may be necessary to delete the cache to free some disk space for the applications and, at a latter date the cache may be set up again.

To expand the PC-CacheFS program main window to the configuration shown in FIG. 2, the user must click the View Statistics>> button (which indicates No Statistics>> when previously selected as shown). Expanding the PC-CacheFS program main window causes additional information to display in the PC-CacheFS program main window on the display unit 6. On the other hand, to collapse the PC-CacheFS program main window, the No Statistics>> button should be selected and clicked.

Over time, the PC-CacheFS program accumulates statistics about the function of the cache, such as the Cache-Hit Rate and Capacity. If it is desired that the fields in the PC-CacheFS program main window are to display the statistics for a particular drive, the statistics can be reset. By resetting the statistics, it is possible to determine the changes of statistics for a particular drive over time and to find out how one particular drive contributes to cache performance overall. Clicking the Reset Statistics button causes statistics to be reset to 0. As information is worked on remotely, new statistics display for the most recent cache conditions.

In order to cache a network drive, the user should click on Cache in the PC-CacheFS program main window followed by Configuration. The selection should then be made of the choice: Let me change my own cache settings. Cache All Network Drives may be selected to unselect this option. In the list of network drives shown, the path of the network drive desired to be cached should be selected followed by a click indicating OK. In this manner, the desired network drives to be cached are selected to be cached.

In order to cache all network drives automatically: In the PC-CacheFS program main window, click Cache; click Configuration; click Let me change my own cache settings; ensure that the box next to the field Cache All Network Drives is selected; and click OK. When new network drives are mapped to the local system configuration, they will automatically be cached.

In order to change the cache size: In the PC-CacheFS program main window, click Cache; click Configuration; click Let me change my own cache settings; in the Size of Disk Cache field, type the size, in megabytes, for the cache; and click OK. This sets the size of the cache as reflected in the cache size designator 24. In order to change the cache location: In the PC-CacheFS program main window, click Cache; click Configuration; click Let me change my own cache settings; in the Cache On Drive field, click the down arrow and select the new drive on which the cache is to be located; and click OK. This selects the new cache location and will be reflected by the cache drive designator 22.

If it is desired to not to use the default settings of PC-CacheFS program, the default cache settings may be changed. For example, if a new hard drive is acquired which has greater disk space than the one on which the cache is currently maintained, a new cache location for the cache may be desired. It is also possible to change the size of the cache to be larger or smaller depending on the Capacity of the cache.

Since the configuration of the network may change and network or CDROM drives 7 may be added or deleted, a specific new drive may be chosen to be cached or all new drives may be cached automatically as they are added to the system configuration.

The Cache-Hit Rate may be understood as follows. The PC-CacheFS program works by retrieving file or directory information from a remote location, such as remote network drive over a phone line, and moving the information into the cache, stored on the local hard drive 9. As information in the cache is accessed, it is likely that the information will change. For example, when updating a spreadsheet that has been saved in the cache, the information that the spreadsheet contains is changed. To ensure that the files in the remote source location are updated with changes made to information in the cache, the PC-CacheFS program makes consistency checks between the cache and the remote or relatively slow access time data source location.

If the information in the cache is more recent than the information in the remote location, it fails the consistency check and is referred to as a "miss". When a "miss" occurs, an amber light displays in the Miss field of the PC-CacheFS program main window. When the information in the cache is current with the information in the remote location, it passes the consistency check and is referred to as a "hit". The information in the remote location is therefore current and does not need to be updated. The average of the number of "hits" to the total number of "hits" and "misses" is referred to as the Cache-Hit Rate.

The capacity percentage displays in the In Use graph of the PC-CacheFS program main window. When the cache is full, capacity reaches 100% in the In Use graph. As the cache becomes updated with new information from the remote data source location after consistency checks, the least recently used information is automatically removed from the cache. By making the cache larger, the least recently used information will most likely remain in the cache, causing a better Cache-Hit Rate during consistency checks.

The PC-CacheFS program was designed to improve the speed at which information may be accessed and used from remote and relatively slow access time data source locations. Because the PC-CacheFS program moves both file information and directory information into the cache, it can provide system performance speeds several times greater than would be experienced without a cache. Located in the Cache Details field of the PC-CacheFS program main window, the Relative Performance statistic, comprising the aforedescribed relative cache performance indicator 26, indicates the percentage of improvement in system speed when compared to the same system without a cache. A relative performance of 100% in the relative cache performance indicator 26 indicates that the system is working at the same speed it would if the PC-CacheFS program were not installed. Relative performance as reflected in the relative cache performance indicator 26 increases as the Cache-Hit Rate increases. A relative performance under 100% indicated by the relative cache performance indicator 26 can occur when PC-CacheFS automatically updates information in the cache, slowing the speed of the system below the regular system speed. A continued relative performance below 100% (as shown by the relative cache performance indicator 26) indicates that the information on the current drive is not being accessed enough times to necessitate caching that particular drive. Some of the factors that affect the Cache-Hit Rate include the type of data access, the cache size and the number of timeouts.

When the PC-CacheFS program retrieves information from a file on the server and places it in the cache, it is performing a function known as file caching. However, the PC-CacheFS program can also perform directory caching. In directory caching, information is stored about the path where a particular chunk of information is located in a directory. By moving this information into the cache, the time it typically takes to search for directory information on the network server is saved. Directory caching can be enabled for one particular drive on the network server, or for all drives or globally across the network.

By changing the read size, the amount of information that the PC-CacheFS program moves to or from the cache during a "read" function may be controlled. The PC-CacheFS program provides a default read size of 8192 bytes, although certain application may require that a smaller read size be set. Making the read size smaller causes fewer bytes of information to be moved between the cache and the remote location at a time. Consequently, the PC-CacheFS program must make more accesses to the network to satisfy a given request. These increased accesses will likely cause a greater load on the network than would occur utilizing a larger read size. By changing the write size, the amount of information that the PC-CacheFS program changes in the cache during a "write" function may be controlled. The PC-CacheFS program provides a default write size of 8192 bytes, although again, certain application may require that a smaller write size be set. Making the write size smaller causes fewer bytes of information to be moved between the cache and the remote location at a time. Consequently, the PC-CacheFS program must make more accesses to the network to satisfy a given request. These increased accesses cause a greater load to be placed on the network than would otherwise occur utilizing a larger read size.

If frequent changes must be made to the file information contained in the cache, the File Timeout Maximum and Minimum may be changed as appropriate. For example, if changes must be frequently made to a document, the File Timeout Maximum can be decreased to 20 and the File Timeout Minimum to 2 seconds. An amount of time greater than 2 seconds (but not more than 20 seconds) will pass before the PC-CacheFS program makes a file comparison between the cache and the remote location. Because comparisons and update of cache and server information are more frequent, greater load is then added to the network and more of a delay in retrieving information may be perceived. In most situations, there will be no need to decrease the File Timeout Minimum below the 3 second default.

The PC-CacheFS program provides a default File Timeout Maximum of 30 seconds and a default File Timeout Minimum of 3 seconds. This means that a maximum of 30 seconds and a minimum of 3 seconds will pass before the PC-CacheFS program compares the file information in the cache with the file information in the remote location for changes. Every time the PC-CacheFS program makes a comparison of cache and remote information, it takes time and adds to network traffic and the load on the network. If frequent changes are not made to the contents of the files in the cache, the File Timeout Maximum and Minimum can be increased. For example, if file information is not generally to be changed, the File Timeout Maximum can be increased to 50 seconds and the File Timeout Minimum to 5 seconds. An amount of time greater than 5 seconds (but not more than 50 seconds) will pass before the PC-CacheFS program makes a comparison between the file information in the cache and the information at the remote location. During this period of time, the information remains safe in the cache and network traffic and load is reduced.

If the directory information contained in the cache is frequently changed, the Directory Timeout Maximum and Minimum can be decreased. For example, if a remote network drive must be reconfigured and the directory structure changes frequently, the Directory Timeout Maximum can be decreased to 45 seconds and the Directory Timeout Minimum to 10 seconds. An amount of time greater than 10 seconds (but not more than 45 seconds) will then pass before the PC-CacheFS program makes a directory comparison between the cache and the remote location. Because comparisons and updates of cache and server information are more frequent, greater load is added to the network and more of a delay in retrieving information may be perceived. In most situations, there is no need to decrease the Directory Timeout Minimum below the 15 second default.

If frequent changes are not made to the directory structure or directory names contained in the cache, the Directory Timeout Maximum and Minimum can be increased. For example, if there is no need to change the directory structure on the remote network drive, the Directory Timeout Maximum can be increased to 120 seconds and the directory Timeout Minimum to 30 seconds, an amount of time greater than 30 seconds (but not more than 120 seconds) will then pass before the PC-CacheFS program makes a directory comparison between the contents of the cache and the remote location. During this period of time, the information remains safe in the cache and network traffic and load is reduced.

The PC-CacheFS program provides a default Directory Timeout Maximum of 60 seconds and a default Directory Timeout Minimum of 15 seconds. This means that a maximum of 60 seconds and a minimum of 15 seconds will pass before the PC-CacheFS program compares the directory information in the cache with the directory information in the remote location for changes. Every time the PC-CacheFS program makes a comparison of cache and remote information, it takes time and adds to network traffic and the load on the network.

If a need arises to use more disk space than is currently available on the local computer, the size of the cache may be changed or its contents "flushed". Making the cache smaller is generally the preferable solution if a sufficient amount of cache space is not being used. As previously described, the amount of cache space currently in use is indicated in the In Use graph. If the In Use percentage is low (i.e., under 50%), then making the cache smaller is a good option. Alternatively, flushing the cache is a preferable solution if there is a temporary need to make space available on the drive 9 of the local computer. Flushing the cache causes the information contained in the cache to be temporarily removed from the hard disk until the information is once again accessed.

If a need arises for more disk space on the local computer than is currently available, and there is no longer a need to use the cache, it may be deleted. Deleting the cache will cause the cache and all of the information contained in it to be completely removed from the computer. Deleting the cache is, therefore, a more permanent operation than flushing the cache, as the cache would have to be set up again and reconfigured for any future use.

As in any caching environment, the caching software must first read data from the source in order to populate the cache for future "read" accesses to the same data. The time required to read the data from the source is measured by a timer function and recorded as a variable $T_S$ (source time, in seconds) along with the amount of data read $D_S$ (source data, in bytes). From these values, a rate $D_S/T_S$ bytes/seconds is determined for the data "read" from the original data source. When the data is copied to the cache, the time required for the transfer is added to a variable $T_C$ (cache time, in seconds) which also includes the time required to access the data from the cache. The amount of data read from the cache is added to a fourth variable, $D_C$ (cache data, in bytes).

The amount of time required to read all of the data, or the sum ($D_S+D_C$), from the source without caching available ($T_{NC}$) is the sum of the time required to populate the cache ($T_S$) plus the amount of time required to perform the cache "read" operation at source speeds ($D_C/(D_S/T_S)$). Stated another way:

$$T_{NC}=T_S+(D_C/(D_S/T_S))$$

The total actual time ($T_A$) is equal to ($T_S+T_C$). Therefore, relative performance ($P_R$) can be defined as:

$$P_R=T_{NC}/T_A; \text{ or}$$

$$P_R=(T_S+D_C/(D_S/T_S))/(T_S+T_C)$$

Figure 3:
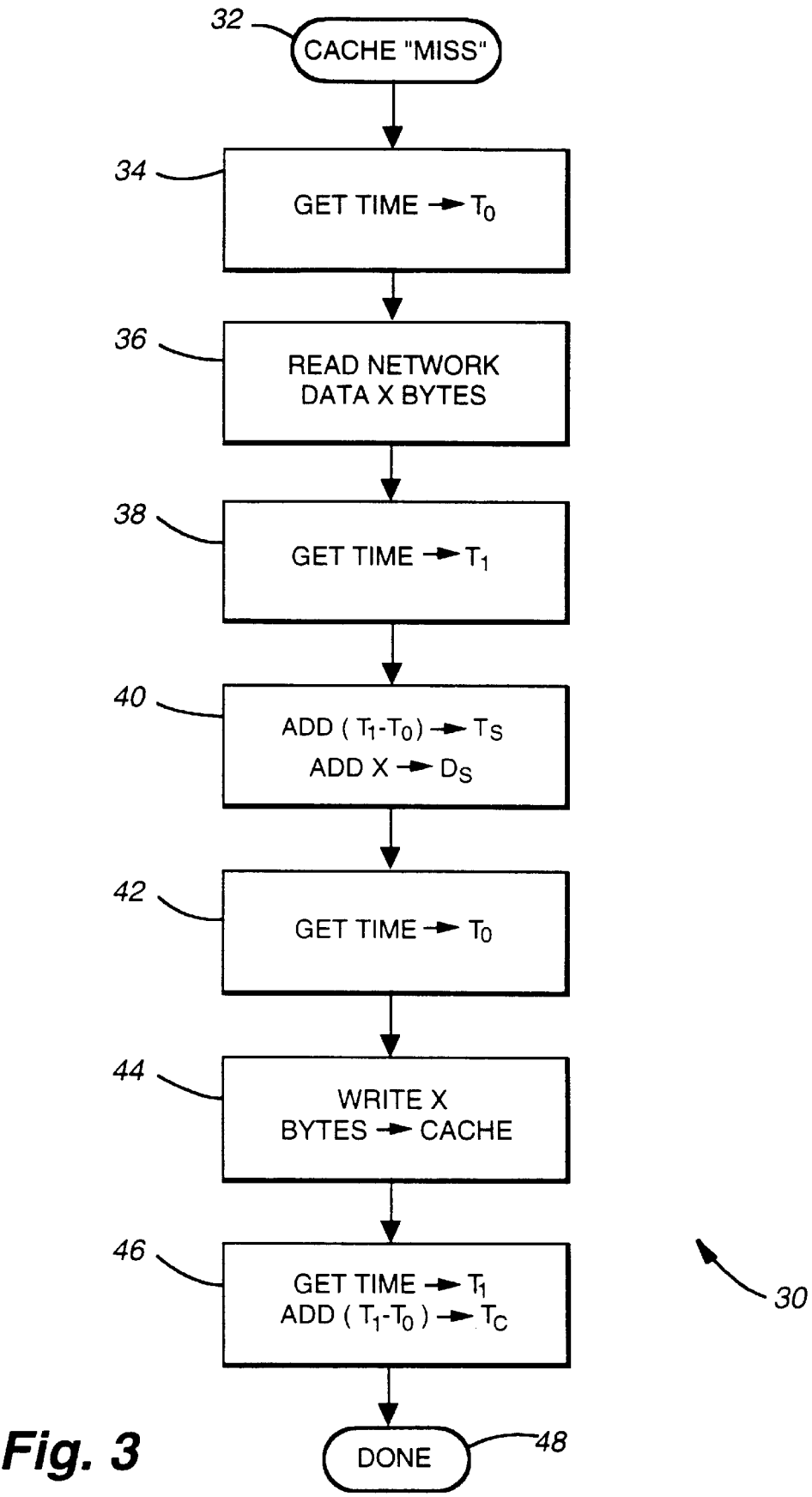
FIG. 3 is a logic flowchart for a system "read" access to data that has not been previously written to the cache and from which cache "miss" operation, values for the variables $T_S$, $D_S$ and $T_C$ may be derived.

With reference additionally now to FIG. 3, a logic flow chart illustrating the possible steps for determining relative cache performance in accordance with the present invention is shown in the event of a request for x bytes of data which is not found in the local data cache (a cache "miss"). The process 30 begins with a determination that a cache "miss" has occurred and that the data must be retrieved from the data source location at step 32.

When a cache "miss" is detected, a timer is started at step 34 and the time placed into a variable $T_0$. Thereafter, data is read from the network 11 (or other data source) with the amount of data being represented by the variable X at step 36. At step 38, the timer is stopped following the transfer of the X bytes of data read from the network 11 and the time placed into the variable $T_1$ at step 38. At step 40, the difference between the time $T_1$ and $T_0$ is placed into the variable $T_S$ and the number of bytes of data read from the network 11 is placed into the variable $D_S$.

At step 42, a second timer is started with the time being entered into the variable $T_0$. At step 44, the X bytes of data previously read from the network 11 are placed into the cache (for example, resident on the disk drive 9). At step 46, the second timer is stopped and the time placed into the variable $T_1$ and the difference between $T_1$ and $T_0$ is placed into the variable $T_C$. At step 48, the process 30 for a cache "miss" is completed.

Figure 4:
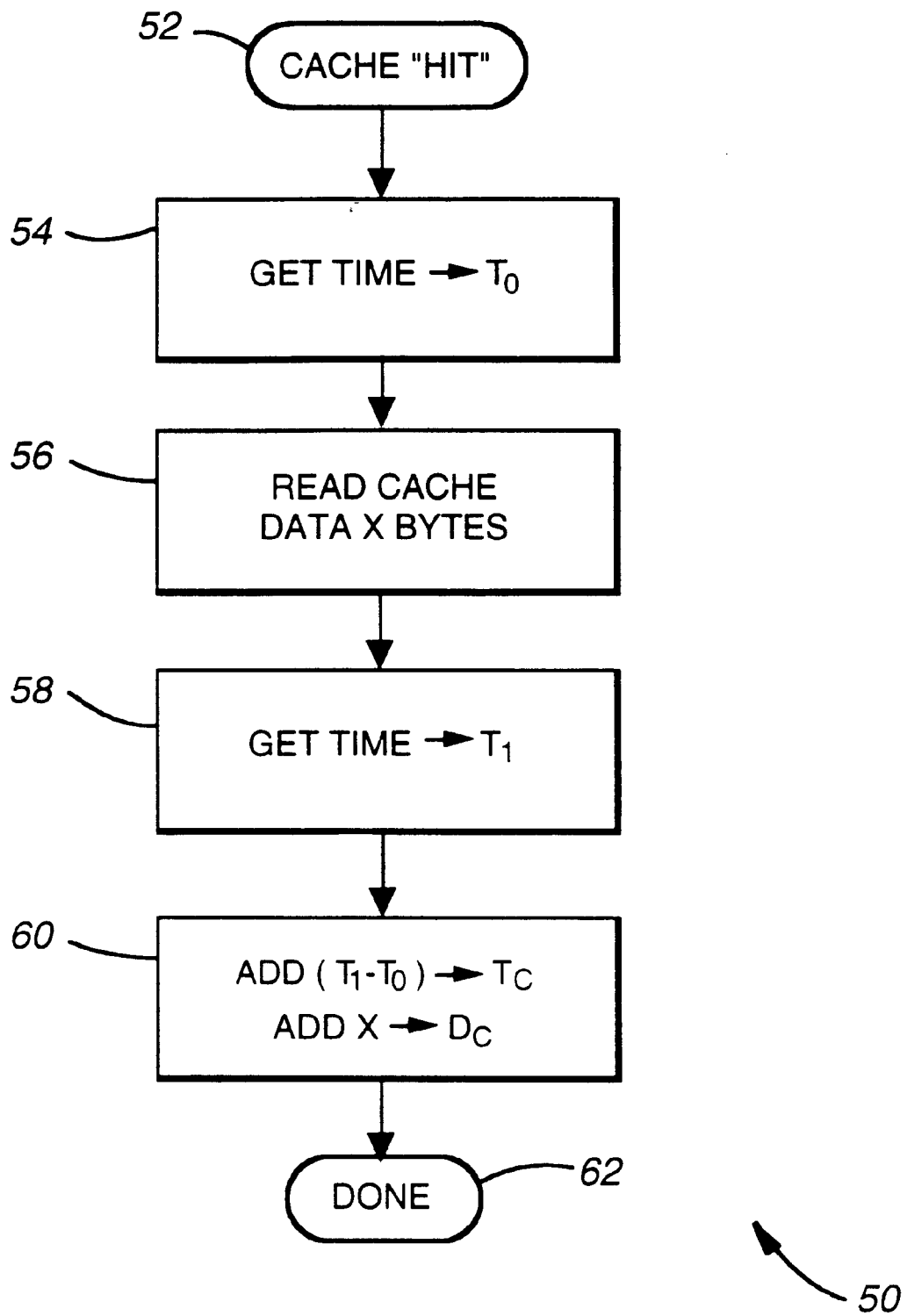
FIG. 4 is an analogous logic flowchart for a system "read" access to data that has been previously written to the cache and from which cache "hit" operation, the value for $D_C$ may be derived.

With reference additionally now to FIG. 4, a process 50 for a cache "hit" is represented. The cache "hit" operation begins at step 52 followed by the initiation of a timer at step 54 where the current time is entered into a variable $T_0$. Thereafter, at step 56, the data is read from the cache comprising the X bytes of requested data.

At step 58, the timer is stopped and the time entered into the variable $T_1$. Thereafter, at step 60, the difference between $T_1$ and $T_0$ is added into the variable $T_C$ and the number of bytes of data read from the cache represented by the variable X are added to the variable $D_C$. The cache "hit" process 50 is then completed at step 62.

While there have been described above the principles of the present invention in conjunction with specific computer program products, graphics user interfaces and computer system configurations, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A method that determines the relative performance ($P_R$) of data accesses to either of a first and a second data source, said method comprising the steps of:

retrieving, by computer readable code devices, a requested amount of selected data ($D_C$) from said second data source if said requested amount of selected data is in said second data source;

timing, by the computer readable code devices, said step of retrieving said requested amount of selected data from said second data source to provide a time ($T_C$);

alternatively retrieving, by the computer readable program code devices, said requested amount of selected data ($D_S$) from said first data source if said requested amount of selected data is not in said second data source;

timing, by the computer readable code devices, said step of alternatively retrieving said requested amount of selected data from said first data source to provide a time ($T_S$);

writing, by the computer readable program code devices, said requested amount of selected data to said second data source;

determining, by the computer readable code devices, a time for said step of writing said requested amount of selected data to said second data source; and adding, by the computer readable code devices, said determined time to ($T_C$);

whereby said relative performance ($P_R$) of said data accesses is given by: $P_R=(T_S+D_C/(D_S/T_S))/(T_S+T_C)$.

2. The method of claim 1 further comprising the step of:

displaying, by the computer readable program code devices, a visual indication of said relative performance ($P_R$).

3. The method of claim 2 including a graphic user interface, and wherein said step of displaying comprises displaying an alphanumeric indication on the graphic user interface.

4. The method of claim 1 further comprising the step of:

accessing, by the computer readable code devices, said first data source over a network link.

5. The method of claim 4 wherein said first data source comprises a server storage device.

6. The method of claim 5 wherein said first data source comprises a CDROM.

7. The method of claim 1 further comprising the step of:

accessing, by the computer readable program code devices, said first data source over a local data bus.

8. The method of claim 1 wherein said second data source comprises a local data cache.

9. A method that determines the relative performance ratio ($P_R$) of data accesses to a first and a second data source, wherein data in said second data source corresponds to data previously retrieved from said first data source, said method comprising the steps of:

initiating, with a computer and with computer readable program code devices, a request for x bytes of data;

determining, with the computer and the computer readable program code devices, y said x bytes of requested data is in said second data source;

retrieving, with the computer and the computer readable program code devices, said x bytes of requested data from said second data source if said x bytes of requested data is in said second data source, said step of retrieving further comprising the steps of:

saving, with the computer and the computer readable program code devices, a number of said x bytes of requested data into a variable $D_C$; and saving, with the computer and the computer readable code devices, a time necessary to retrieve said x bytes of requested data from said second data source into a variable $T_C$;

alternatively retrieving, with the computer and the computer readable code devices, said x bytes of requested data from said first data source if said x bytes of requested data is not in said second data source, said step of alternatively retrieving further comprising the steps of:

saving, with the computer and the computer readable code devices, a number of said x bytes of requested data into a variable $D_S$;

saving, with the computer and the computer readable code devices, a time necessary to retrieve said x bytes of requested data from said first data source into a variable $T_S$;

writing, with the computer and the computer readable code devices, said x bytes of requested data to said second data source; and saving, with the computer and the computer readable code devices, a time necessary to write said x bytes of requested data to said second data source into a variable $T_C$; and computing, with the computer and the computer readable code devices, a performance ratio ($P_R$) of said data accesses in accordance with the formula:

$P_R(T_S+D_C/(D_S/T_S))/(T_S+T_C)$.

10. The method of claim 9 further comprising the step of:

displaying, with the computer and the computer readable program code devices, a visual indication of said performance ratio ($P_R$).

11. The method of claim 10 including a graphic user interface, and wherein said step of displaying includes displaying an alphanumeric indication on the graphic user interface.

12. The method of claim 9 further comprising the step of:

accessing, with the computer and the computer readable program code devices, said first data source over a network link.

13. The method of claim 12 wherein said first data source comprises a server storage device.

14. The method of claim 9 further comprising the step of:

accessing, with the computer and the computer readable program code devices, said first data source over a local data bus.

15. The method of claim 14 wherein said first data source comprises a CDROM.

16. The method of claim 9 wherein said second data source comprises a local data cache.

* * * * *

UNITED STATES PATENT AND TRADEMARK OFFICE
CERTIFICATE OF CORRECTION

PATENT NO. : 5,940,855
DATED : August 17, 1999
INVENTOR(S) : Kevin W. KAYES; Daniel H. SCHAFFER; Brian BERLINER It is certified that error appears in the above-identified patent and that said Letters Patent is hereby corrected as shown below:

Column 15, line 37, change "able program code devices, y said x bytes of requested" to
 --able program code devices, if said x bytes of requested--

Column 16, line 25, change "$P_R(T_S+D_C/(D_S/T_S))/(T_S+T_C)$." to
 -- $P_R = (T_S+D_C/(D_S/T_S))/(T_S+T_C)$. --

Signed and Sealed this

First Day of February, 2000

Attest:

Q. TODD DICKINSON

Attesting Officer

Acting Commissioner of Patents and Trademarks